(12) United States Patent
Murasaki et al.

(10) Patent No.: US 8,857,018 B2
(45) Date of Patent: Oct. 14, 2014

(54) CLIP FOR FASTENING SURFACE SKIN MATERIAL

(75) Inventors: Ryuichi Murasaki, Tokyo (JP); Tetsuya Yoshino, Tokyo (JP); Eiichi Sasada, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 13/812,874

(22) PCT Filed: Aug. 1, 2011

(86) PCT No.: PCT/JP2011/067607
§ 371 (c)(1),
(2), (4) Date: Jan. 29, 2013

(87) PCT Pub. No.: WO2012/017986
PCT Pub. Date: Feb. 9, 2012

(65) Prior Publication Data
US 2013/0117973 A1 May 16, 2013

(30) Foreign Application Priority Data

Aug. 4, 2010 (JP) .................................. 2010-005213

(51) Int. Cl.
| | | |
|---|---|---|
| A47C 31/02 | (2006.01) | |
| A47C 31/11 | (2006.01) | |
| F16B 5/06 | (2006.01) | |
| F16B 2/20 | (2006.01) | |
| B68G 7/12 | (2006.01) | |

(52) U.S. Cl.
CPC ................ *F16B 5/06* (2013.01); *A47C 31/023* (2013.01); *F16B 2/20* (2013.01); *B68G 7/12* (2013.01)

USPC ................... 24/343; 24/297; 24/370; 24/457; 24/601.2; 297/218.1; 297/218.2

(58) Field of Classification Search
CPC ....... A47C 31/023; B60N 2/5825; B68G 7/12
USPC ........................................................ 24/601.2
See application file for complete search history.

(56) References Cited

U.S. PATENT DOCUMENTS 4,691,416 A * 9/1987 Nakayama et al. .......... 24/114.9
5,518,292 A * 5/1996 Cozzani ..................... 297/218.5
(Continued)

FOREIGN PATENT DOCUMENTS

| CN | 101031224 A | 9/2007 |
| FR | 2735960 A1 | 1/1997 |

(Continued)

OTHER PUBLICATIONS

Supplementary European Search Report, European Patent Application No. 11814611.7, mailed Mar. 6, 2014.

(Continued)

*Primary Examiner* — Robert J Sandy
*Assistant Examiner* — Louis Mercado
(74) *Attorney, Agent, or Firm* — Kilpatrick Townsend & Stockton LLP

(57) ABSTRACT

A cover-material fixing clip includes: a chuck that pinches a locking hem formed on a back surface of a cover material; a hook that locks a wire provided in a groove of a cushion material; and a guide lever that is provided facing an opening of the hook. A proximal end of the hook is connected to a bottom of the chuck opposite to the cover material. The guide lever is connected to a side surface of the chuck.

10 Claims, 12 Drawing Sheets

(56) References Cited

U.S. PATENT DOCUMENTS

| | | | |
|---|---|---|---|
| 6,048,025 A * | 4/2000 | Tillner | 297/218.1 |
| 6,122,806 A * | 9/2000 | Umezawa et al. | 24/598.6 |
| 7,287,305 B2 * | 10/2007 | Bednarski | 24/297 |
| 7,487,575 B2 * | 2/2009 | Smith | 24/297 |
| 7,568,761 B2 * | 8/2009 | Mashimo | 297/218.4 |
| 7,752,720 B2 * | 7/2010 | Smith | 24/297 |
| 7,901,002 B2 * | 3/2011 | Mashimo | 297/218.3 |
| 2009/0140569 A1 | 6/2009 | Mashimo | |
| 2012/0284974 A1 * | 11/2012 | Yamamoto et al. | 24/458 |

FOREIGN PATENT DOCUMENTS

| | | | |
|---|---|---|---|
| JP | S64-19399 U | 1/1989 | |
| JP | 3-5359 Y2 | 2/1991 | |
| JP | H04-312492 A | 11/1992 | |
| JP | H05-31699 U | 4/1993 | |
| JP | 5-79 Y | 5/1993 | |
| JP | 2006-122594 | 5/2006 | |
| JP | 2007-260340 A | 10/2007 | |
| JP | 2009-100924 A | 5/2009 | |
| JP | 2011-45424 A | 3/2011 | |
| JP | 2011-45469 A | 3/2011 | |

OTHER PUBLICATIONS

International Search Report, PCT Application No. PCT/JP2011/067607, mailed Nov. 1, 2011.

Office Action, Chinese Patent Application No. 201180038191.5, mailed Feb. 7, 2014.

Office Action, Japanese Patent Application No. 2012-239105, mailed Mar. 11, 2014.

* cited by examiner

CLIP FOR FASTENING SURFACE SKIN MATERIAL

This application is a national stage application of PCT/JP2011/067607 which claims priority to Japanese Patent Application No. 2010-005213, both of which are incorporated herein by reference.

TECHNICAL FIELD

The present invention relates to a cover-material fixing clip used for fixing a cover material that covers a surface of a chair, a seat and the like.

BACKGROUND ART

Typically, in a chair used in a room or a seat in a vehicle, a cushion material or a soft pad whose surface is covered with a cover material is frequently used in a portion to be touched by a human body (e.g., a seat surface and a back rest). Various arrangements are employed for fixing such a cover material.

Among the arrangements, as an arrangement to fix a middle of the cover material and concealable from the outside, there has been known an arrangement where a wire is provided in a groove of the cushion material, clips are arranged on a back of the cover material, and the clips are engaged with the wire to fix the cover material from the back thereof.

In this arrangement, a reverse claw-shaped hook to be engaged with the wire and a guide lever along the hook are formed on a bottom of a portion that locks a locking hem. For introducing the wire into the hook, the guide lever is elastically deformed to be apart from the hook to allow the wire to pass through a gap between the guide lever and the hook.

As such a locking arrangement, there has been known an arrangement in which, after a locking hem extending along the wire and having a bulging tip end is formed on a back of the cover material, and a chuck having a pair of locking claws is formed in the clip, the chuck pinches the tip end of the locking hem. In this arrangement, an interval between the clips to be set on the locking hem is freely determinable or adjustable. The hook and the guide lever project straight from the bottom of the chuck, i.e., a surface opposite to the pair of locking claws (see Patent Literature 2).

In the above arrangement, there has been proposed an arrangement in which an elongated hole formed on the locking hem and a stopper piece formed in the clip are engaged with each other. In this arrangement, the engagement of the stopper piece with the elongated hole prevents the clip from unnecessarily moving along the hem. The chuck, hook and guide lever to be used here have the same shape as those in the above arrangement (see Patent Literature 3).

CITATION LIST

Patent Literature(s)

Patent Literature 1 JP-UM-B-5-79
Patent Literature 2 JP-A-2006-122594
Patent Literature 3 JP-A-2009-100924

SUMMARY OF THE INVENTION

Problems to be Solved by the Invention

However, in Patent Literatures 1 to 3 described above, when the wire is introduced in the hook, it is necessary to elastically deform the guide lever to ensure a gap equivalent to a diameter of the wire between the guide lever and the hook. At this time, when the guide lever is not sufficiently deformed against the hook, it is difficult to pass the wire through the gap.

In Patent Literatures 1 and 3, a tip end of the hook and a tip end of the guide lever are respectively bent in directions opposite to each other, so that the gap is widened toward the tip ends, whereby the wire is smoothly introduced into the hook. However, while the tip ends in the above form are in contact with the cushion material, the gap-widening movement of the hook and the guide lever for introducing the wire is hampered.

An object of the invention is to provide a cover-material fixing clip capable of easily introducing a wire therein.

Means for Solving the Problems

According to an aspect of the invention, a cover-material fixing clip includes: a chuck that pinches a locking hem formed on a back surface of a cover material; a hook that locks a wire provided in a groove of a cushion material; and a guide lever that is provided facing an opening of the hook, in which a proximal end of the hook is connected to a bottom of the chuck opposite to the cover material, and the guide lever is connected to a side surface of the chuck.

In this arrangement, since the guide lever is connected to the side surface of the chuck, the length of the guide lever can be increased and the guide lever can be more easily flexed than a guide lever in a typical arrangement where the hook and the guide lever are both provided on the bottom of the chuck. Accordingly, elastic deformation of the guide lever becomes easy in introduction of the wire, so that the wire can be easily introduced into the hook.

On the other hand, in the invention, since the hook is connected to the bottom of the chuck, a load transfer path for fixation running from the wire through the hook, the chuck and the locking hem to the cover material can be made linear, thereby reliably fixing the cover material.

According to the above aspect of the invention, it is preferable that the guide lever is connected to a middle of the side surface of the chuck, and a guiding projection extending toward the guide lever is provided on the bottom of the chuck.

In this arrangement, a connection of the guide lever to the middle (i.e., a portion closer to the cover material than the bottom) of the side surface of the chuck can ensure a sufficient length of the guide lever. In this arrangement, a dent is generated between a vicinity of a connection of the guide lever and the chuck, and the wire to be introduced into the hook may possibly enter the dent depending on the diameter of the wire. However, in this arrangement, since the guiding projection guides the wire, the wire can be prevented from erroneously entering the dent.

According to the above aspect of the invention, it is preferable that a curved portion is formed in the guide lever.

In this arrangement, since flexure of the guide lever becomes easier, the wire can be more easily introduced into the hook.

According to the above aspect of the invention, it is preferable that inclined surfaces are respectively formed on side surfaces of tip ends of the hook and the guide lever, the side surfaces being remote from each other, the inclined surfaces approaching each other toward tip ends thereof.

In this arrangement, even when the hook and the guide lever stick into a bottom of the groove of the cushion material, the hook and the guide lever receive a reaction force in directions approaching each other, so that the wire is prevented from dropping off by an unexpected gap expansion between the hook and the guide lever.

According to the above aspect of the invention, it is preferable that a jig receiving portion that allows an operational jig to be inserted thereinto from a side of the chuck is provided on a side surface of the hook.

In this arrangement, since the operational jig is inserted into the jig receiving portion to move or incline the hook sideward relative to the wire, the engagement between the hook and the wire can be released, or introduction of the wire can be assisted.

According to the above aspect of the invention, it is preferable that the chuck includes a pair of locking claws, the locking claws are fixed to a chuck base, and the chuck base is provided with a stopper in a form of a projection extending in directions in which the locking claws face each other.

In this arrangement, the stopper intersects the locking hem pinched by the chuck. Accordingly, by setting an appropriate height of the stopper, the locking hem pinched by the chuck is brought into contact with the stopper, thereby preventing the clip from moving along the locking hem.

In this arrangement, since friction lock between the locking hem and the stopper is used, a binding force is weaker than that in the typical arrangement using the stopper piece and the elongated hole. However, lock is possible at any position where an elongated hole is not provided and without a preparation such as formation of an elongated hole and the like for locking.

According to the above aspect of the invention, it is preferable that the chuck includes a pair of locking claws, the locking claws are fixed to a chuck base, and a stopper in a form of a projection extending in a longitudinal direction of each of the locking claws is provided on an inner surface of each of the locking claws.

In this arrangement, when the locking hem is inserted in the chuck, the periphery of the stopper is brought into pressure contact with the side surface of the locking hem to restrict movement of the locking hem. In addition, when a groove or the like is formed on the locking hem, the movement of the locking hem can be more reliably restricted by engaging the stopper with the groove.

Further, since the stopper is continuously formed in a longitudinal direction of the locking claw along the inner surface thereof, bending rigidity of the locking claw is adjustable.

DESCRIPTION OF EMBODIMENT(S)

Embodiments of the invention will be described below with reference to the attached drawings.

First Exemplary Embodiment

FIGS. 1 to 7 show a covering-material fixing clip according to a first exemplary embodiment of the invention.

Figure 1:
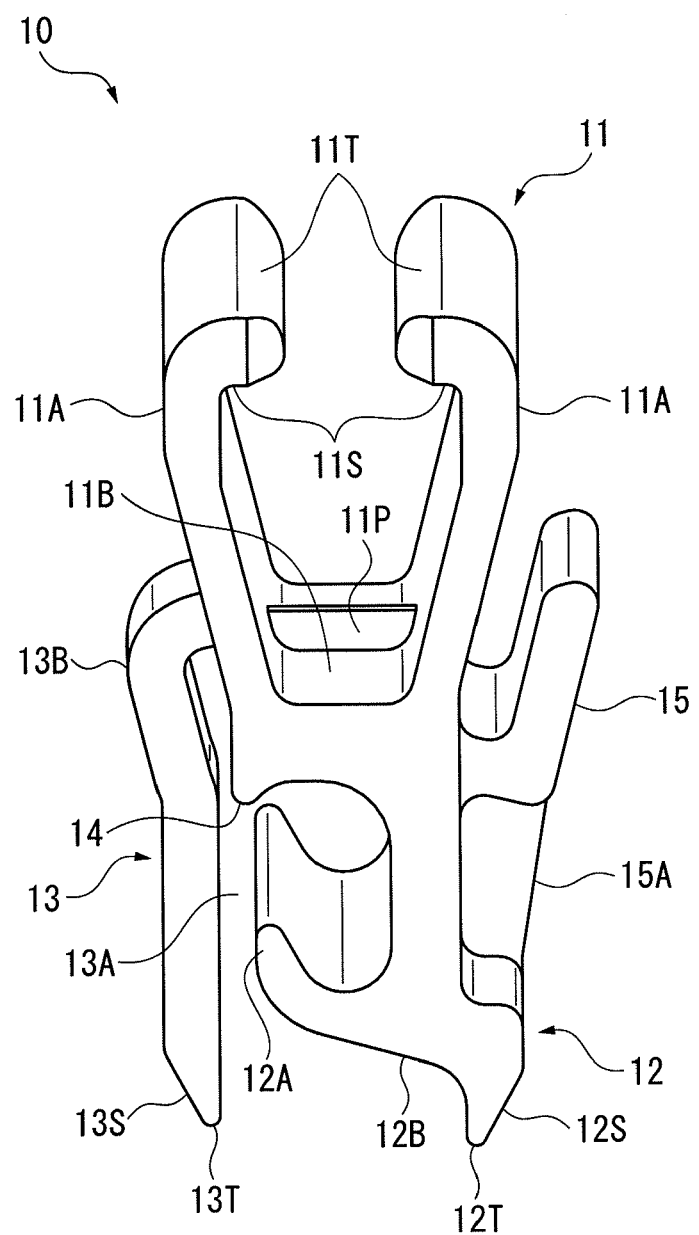
FIG. 1 illustrates a first exemplary embodiment of the invention.

As shown in FIG. 1, a clip 10 according to the exemplary embodiment is used for stretching a cover material 2 over a surface of a cushion material 1 for a seat of a vehicle.

The cushion material 1 is a synthetic resin foam material (e.g., foamed polyurethane) molded in a shape of a seat. The cushion material 1 is formed with a groove 3 for fixing a cover material. In the groove 3, a wire 4 is set. The wire 4 is a metallic wire and can be inserted in the cushion material 1 in molding the cushion material 1.

The cover material 2 is a synthetic resin fabric sheet and the like that covers the surface of the cushion material 1. The cover material 2 has a seam 5 in a position corresponding to the groove 3 of the cushion material 1. The seam 5 is provided by folding a pair of sheet hems toward a back surface of the cover material, layering a locking tape 6 on the sheet hems, and sewing the sheet hems and the locking tape 6 together.

The locking tape 6 is attached with a locking end member 7 along a hem of the locking tape 6 opposite to the seam 5. The locking end member 7 is a substantially Y-shaped mold material made of synthetic resin. The locking end member 7 may be attached to the locking tape 6 by an insert-molding of one side of the locking tape 6.

The locking tape 6 and the locking end member 7 form a locking hem 8 on the back surface of the cover material 2.

In the exemplary embodiment, in order to fix the cover material 2 to the cushion material 1, the locking hem 8 on the back surface of the cover material 2 is locked with the wire 4 through the clip 10.

Figure 2:
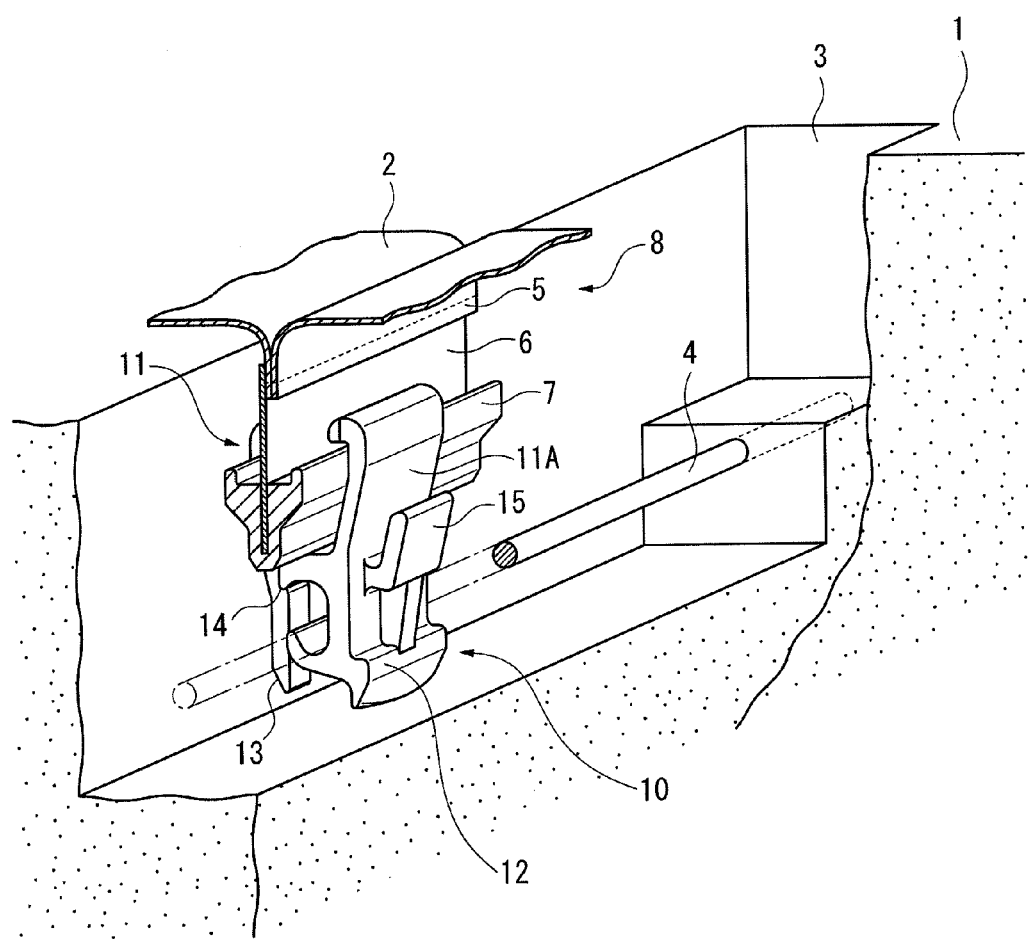
FIG. 2 illustrates a using condition in the first exemplary embodiment.

As shown in FIG. 2, the clip 10 includes: a chuck 11 for pinching the locking hem 8; a hook 12 for locking the wire 4; and a guide lever 13 facing an opening of the hook 12.

The chuck 11 has a pair of locking claws 11A. Proximal portions of the locking claws 11A are fixed on both sides of a chuck base 11B. Intermediate portion of the locking claws 11A are formed in a manner to be widened upward. Tip ends 11T of the locking claws 11A are bent inward, in other words, in a direction facing each other. The tip ends 11T have respective locking surfaces 11S to face the chuck base 11B. The locking surfaces 11S are parallel to the chuck base 11B, in other words, are equidistant from the chuck base 11B.

In the chuck 11, the locking tape 6 of the locking hem 8 can be inserted between the pair of tip ends 11T, and the locking surfaces 11S enables locking of the locking end member 7 of the locking hem 8, whereby the chuck 11 can lock the locking hem 8.

The chuck 11 has a stopper 11P that is formed on a surface of the chuck base 11B as a projection extending in directions in which the locking claws 11A face each other.

When the chuck 11 locks the locking hem 8, the locking end member 7 is housed inside the pair of locking claws 11A. The locking end member 7 near the cover material 2 is in contact with the locking surfaces 11S by a pair of locking portions 7A. In the exemplary embodiment, each of the locking portions 7A is provided by a projection that projects in a direction toward the cover material 2 and is continuous along the locking hem 8. However, the locking portion 7A may be a line of projections intermittently formed along the locking hem 8. Alternatively, the locking end member 7 near the cover material 2 may be flattened without a projection, and shoulders of the locking end member 7 may be used as the locking portions 7A. A side of the locking end member 7 opposite to the cover material 2, namely, a tip end 7B is in contact with the stopper 11P, where friction restricts movement of the chuck 11 in a continuous direction of the locking hem 8 (see, FIG. 2 or 4).

A proximal portion of the hook 12 is connected to a bottom of the chuck base 11B (i.e., a surface opposite to the cover material 2).

The hook 12 includes: a claw portion 12A that locks the wire 4; and an outer circumferential surface 12B that extends toward the guide lever 13 in an inclined manner from an inside of a tip end 12T of the hook 12 to the chuck 11. With this arrangement, the wire 4 introduced between the tip end 12T of the hook 12 and a tip end 13T of the guide lever 13 (i.e., a clearance C1 in FIG. 5) is brought into contact with the outer circumferential surface 12B and guided toward the guide lever 13.

After the wire 4 is guided toward the guide lever 13 by the outer circumferential surface 12B, the wire 4 is introduced toward an inside of the claw portion 12A through a gap 13A between the guide lever 13 and the claw portion 12A. Although a diameter of the wire 4 is larger than the gap 13A in a normal state, the wire 4 is allowed to pass through the gap 13A by elastically deforming the hook 12 and the guide lever 13 to expand the gap therebetween (i.e., a clearance C2 in FIG. 6).

The guide lever 13 is connected to a middle of a side surface of the chuck 11, namely, a middle of the locking claw 11A. A curved portion 13B is formed in the guide lever 13.

Since the guide lever 13 is provided with the curved portion 13B, the length of the guide lever 13 is increased, so that the guide lever 13 is more easily flexed by elastic deformation.

On the bottom of the chuck base 11B of the chuck 11, a guiding projection 14 is formed extending toward the guide lever 13.

Due to the curved portion 13B, a proximal end of the guide lever 13 extends from the middle of the chuck 11 with a predetermined interval apart from the chuck 11. In this arrangement, a U-shaped dent is formed between the guide lever 13 and the chuck 11, so that the wire 4 may possibly erroneously enter the dent. However, with the guiding projection 14 formed in a manner to block the dent, the wire 4 can be prevented from erroneously entering the dent. Further, the guiding projection 14 can smoothly introduce the wire 4, which already passes through the gap 13A, into the inside of the claw portion 12A.

On mutually remote side surfaces of the tip ends 12T and 13T of the hook 12 and the guide lever 13, the inclined surfaces 12S and 13S approaching each other toward tip ends thereof are formed.

With the inclined surfaces 12S and 13S, even when the hook 12 and the guide lever 13 stick into a bottom of the groove 3 of the cushion material 1, the hook 12 and the guide lever 13 receive reaction force in directions approaching each other, so that the wire 4 is prevented from dropping off by an unexpected gap-expansion between the hook 12 and the guide lever 13.

A jig receiving portion 15 is formed on a side surface of the clip 10 near the hook 12, namely, on a portion extending from the hook 12 to the chuck base 11B. A slotted screwdriver T (i.e., an operational jig) (see FIGS. 5 and 6) can be inserted into the jig receiving portion 15 from the side of the chuck 11.

The jig receiving portion 15 is an L-shaped projection that is raised from a side surface of the chuck base 11B and is bent toward the chuck 11. The jig receiving portion 15 includes a rib 15A that reaches the tip end of the hook 12 in order to reinforce the jig receiving portion 15.

In such a jig receiving portion 15, by inserting the screwdriver T (i.e., the operational jig) into the jig receiving portion 15 from the side of the chuck 11 and applying force sideward, the hook 12 of the clip 10 is deformed to expand the gap 13 between the hook 12 and the guide lever 13. At this time, since the rib 15A is provided, the sideward force is sufficiently transmitted to the hook 12.

Next, a fixing operation in the exemplary embodiment will be described with reference to FIGS. 3 to 7.

Figure 3:
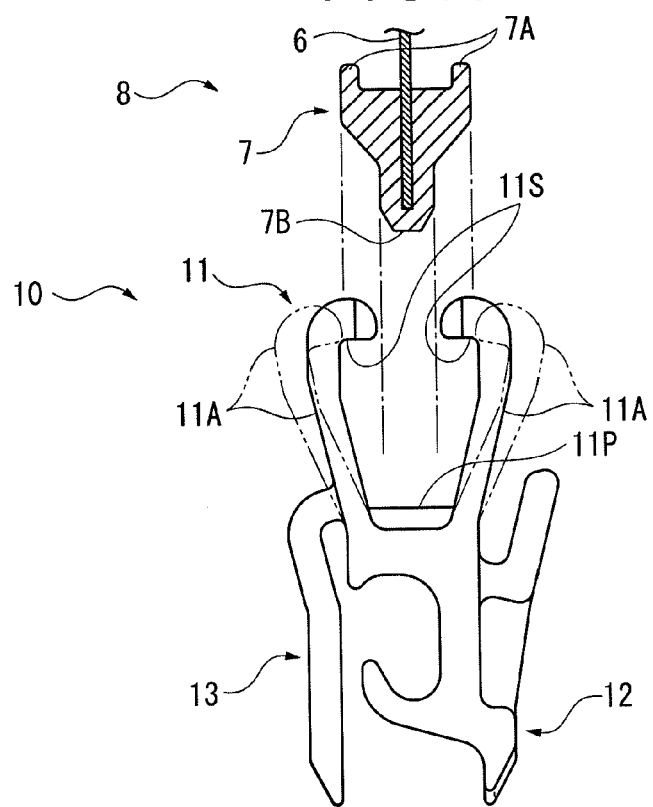
FIG. 3 illustrates a condition before attachment to a locking hem in the first exemplary embodiment.

Firstly, as shown in FIG. 3, the locking end member 7 of the locking hem 8 is pressed on the chuck 11 of the clip 10 and is strongly squeezed thereinto to expand a pair of locking claws 11A, so that the locking end member 7 is squeezed between a pair of tip ends 11T.

Figure 4:
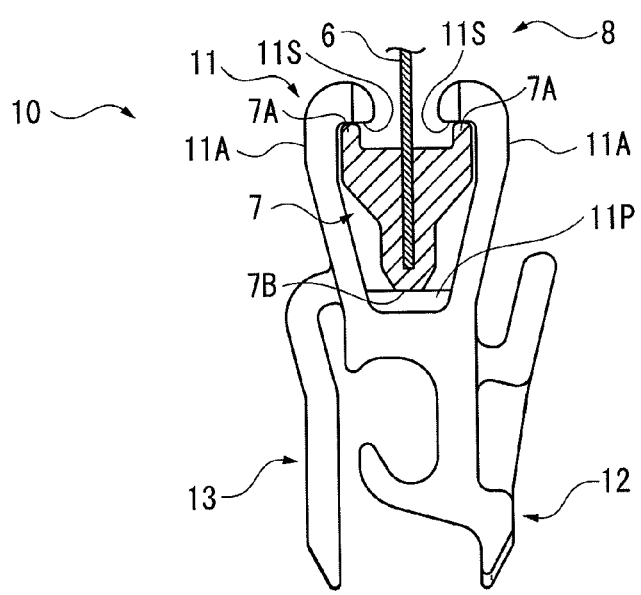
FIG. 4 illustrates a condition after attachment to the locking hem in the first exemplary embodiment.

By this operation, as shown in FIG. 4, the locking end member 7 is housed between the pair of locking claws 11A, where the locking portions 7A of the locking end member 7 are in contact with the locking surface 11S and the tip end 7B is in contact with the stopper 11P, in other words, the locking end member 7 is held between the locking surface 11S and the stopper 11P.

Under this condition, since the stopper 11P is in pressure contact with the tip end 7B, and the locking surface 11S is in pressure contact with locking portion 7A, mutual friction restricts the movement of the chuck 11 in the continuous direction of the locking hem 8.

Accordingly, while the locking end member 7 is firmly held in the chuck 11 and the clip 10 locks the locking hem 8, the movement of the clip 10 along the locking hem 8 is restricted.

In the same procedure, a plurality of clips 10 sequentially lock the locking hem 8 at a predetermined interval.

Figure 5:
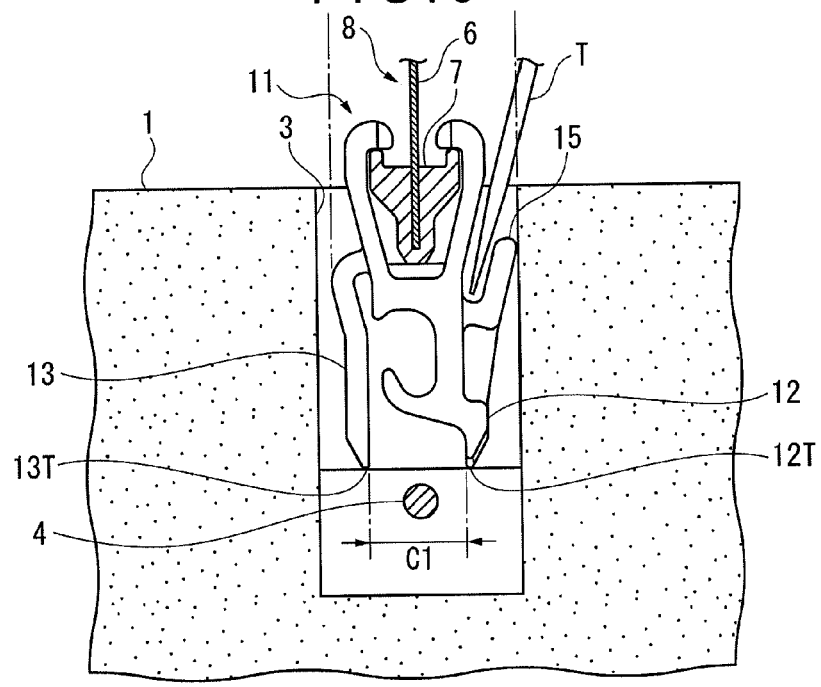
FIG. 5 illustrates a condition before locking to a wire in the first exemplary embodiment.

Next, as shown in FIG. 5, the locking hem 8 locked by the clips 10 is introduced into the groove 3 of the cushion material 1 and the clips 10 are sequentially locked with the wire 4.

Specifically, after the slotted screwdriver T (i.e., the operational jig) is inserted into the jig receiving portion 15 of the clip 10 locking the locking hem 8, the slotted screwdriver T is operated to introduce the clip 10 together with the locking hem 8 into the groove 3.

In accordance with introduction of the clips 10 into the groove 3, the wire 4 extending over the bottom of the groove 3 enters the gap between the hook 12 and the guide lever 13.

Since the clearance C1 between the tip end 12T of the hook 12 and the tip end 13T of the guide lever 13 is sufficiently larger than a diameter of the wire 4, when the clip 10 is moved close to the wire 4, the wire 4 is automatically brought in the clearance C1 between the hook 12 and the guide lever 13.

Figure 6:
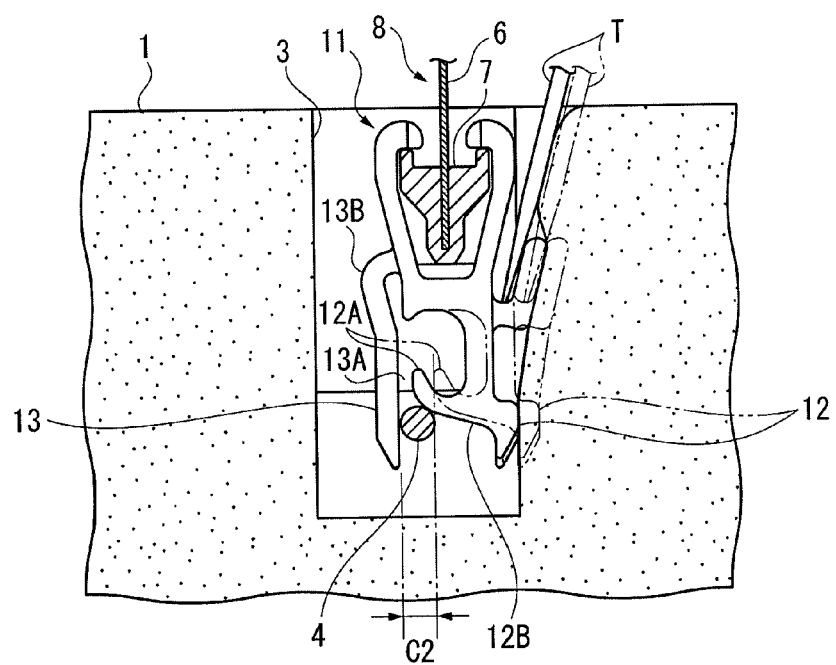
FIG. 6 illustrates a condition during locking to the wire in the first exemplary embodiment.

As shown in FIG. 6, as the clip 10 further proceeds, the wire 4 introduced between the hook 12 and the guide lever 13 is brought into contact with the outer circumferential surface 12B and is guided toward the guide lever 13 by the inclination of the outer circumferential surface 12B, whereby the wire 4 is brought into contact with an inner surface of the guide lever 13.

Since the gap 13A between the claw portion 12A of the hook 12 and the inner surface of the guide lever 13 is smaller than the diameter of the wire 4, the wire 4 cannot pass through the gap 13A unless the gap 13A is deformed. This arrangement is also for preventing the wire 4 from dropping off the hook 12 after the wire 4 is locked in the hook 12.

In this state, the screwdriver T used for introducing the clip 10 (downward in FIG. 6) is moved away from the guide lever 13 (rightward in FIG. 6). With this operation, the clip 10 is entirely displaced in one direction (see a two-dot chain line in FIG. 6) while deforming an inner surface of the groove 3 of the cushion material 1.

Herein, although the hook 12 is displaced, the movement of the guide lever 13 is restricted because the guide lever 13 is brought into contact with the wire 4. As a result, the guide lever 13 is elastically deformed to be separated from the hook 12, particularly, the claw portion 12A, so that the gap 13A between the claw portion 12A and the inner surface of the guide lever 13 is widened. When the gap 13A is widened to reach the clearance C2 larger than the diameter of the wire 4, the wire 4 can pass through the gap 13A.

In this exemplary embodiment, since the guide lever 13 is connected to the side surface of the chuck 11, the guide lever 13 can be made longer than a distance from the bottom of the chuck 11 to the tip end 13T of the guide lever 13 (i.e., a tip end of the clip 10). With this arrangement, elastic deformation of the guide lever 13 easily occurs with the same material and cross section, so that the wire 4 easily passes through the gap 13A.

Further, since the curved portion 13B is formed in the guide lever 13, the effective length of the guide lever 13 is increased. Accordingly, the guide lever 13 is also easily flexible, so that the wire 4 easily passes through the gap 13A.

Instead of using the screwdriver T, the clip 10 may be strongly pressed onto the wire 4, whereby the wire 4 is guided from the outer circumferential surface 12B to the claw portion 12A to expand the guide lever 13. By such a forcible operation, the wire 4 can also pass through the gap 13A.

Figure 7:
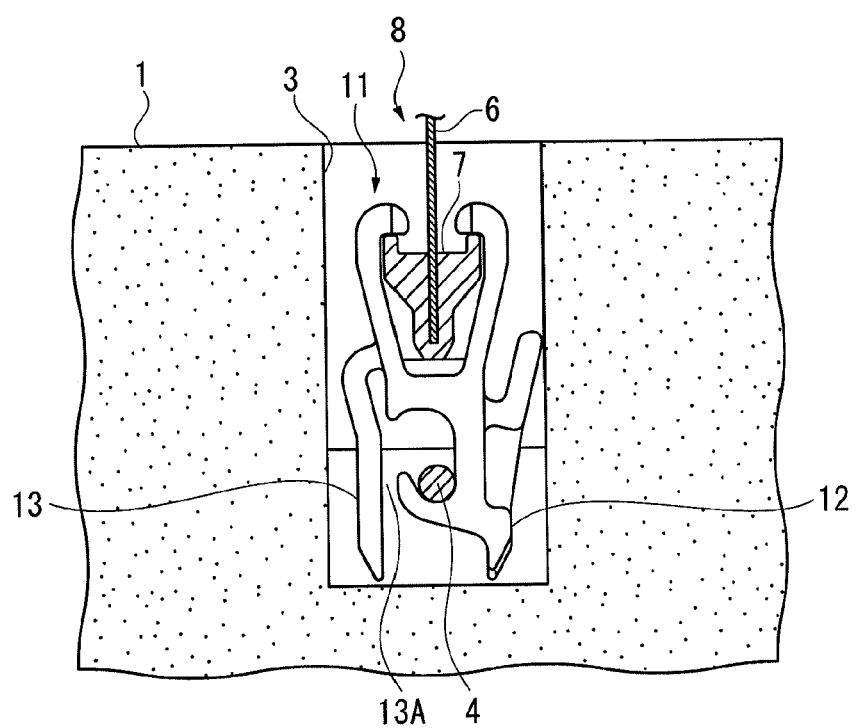
FIG. 7 illustrates a condition after being locked to the wire in the first exemplary embodiment.

As shown in FIG. 7, the wire 4 after passing through the gap 13A is housed inside the hook 12 and receives tension from the locking hem 8, whereby the wire 4 is brought in close contact with an arc-like inner circumference of the claw portion 12A to generate reaction force. Thus, the locking hem 8 and the wire 4 are fixed to each other, so that the cover material 2 can be fixed to the cushion material 1 (see FIG. 2).

According to the exemplary embodiment, the following advantages are attainable.

Since the guide lever 13 is connected to the side surface of the chuck 11, particularly, the middle of the chuck 11, the guide lever 13 can be lengthened and more easily flexed than a guide lever 13 in a typical arrangement where the hook 12 and the guide lever 13 are both provided on the bottom of the chuck 11. Accordingly, elastic deformation of the guide lever 13 becomes easy in introduction of the wire 4, so that the wire 4 can be easily introduced into the hook 12.

On the other hand, since the hook 12 is connected to the bottom of the chuck 11 in this exemplary embodiment, a load transfer path for fixation running from the wire 4 through the hook 12, the chuck 11 and the locking hem 8 to the cover material 2 can be made linear, thereby reliably fixing the cover material.

The guiding projection 14 extending toward the guide lever 13 is formed on the bottom of the chuck 11. Accordingly, even if a dent is formed between a vicinity of a connection of the guide lever 13 and the chuck 11, the wire 4 can be prevented from erroneously entering the dent since the guiding projection 14 guides the wire 4.

Since the guide lever 13 is formed with the curved portion 13B, elastic deformation of the guide lever 13 becomes easy, so that the wire 4 can be more easily introduced into the hook 12.

The tip end 12T of the hook 12 and the tip end 13T of the guide lever 13 are respectively formed with the inclined surfaces 12S and 13S approaching each other toward the tip ends on the respective side surfaces remote from each other. Accordingly, even if the hook 12 and the guide lever 13 stick into the bottom of the groove 3 of the cushion material 1, the hook 12 and the guide lever 13 receive reaction force in directions approaching each other, so that the wire 4 is prevented from dropping off by an unexpected gap-expansion between the hook 12 and the guide lever 13.

The jig receiving portion 15 into which the slotted screwdriver T (i.e., the operational jig) can be inserted from the side of the chuck 11 is formed on the side surface of the hook 12. Accordingly, when the operational jig is inserted into the jig receiving portion 15 to move or incline the hook 12 sideward relative to the wire 4, the engagement between the hook 12 and the wire 4 can be released, or introduction of the wire 4 can be assisted.

The chuck 11 includes: the pair of the locking claws 11A; the chuck base 11B to which the locking claws 11A are fixed; and the stopper 11P that is formed on the chuck base 11B as a projection extending in directions in which the locking claws 11A face each other. With this arrangement, the stopper 11P intersects the locking hem 8 pinched by the chuck 11. Accordingly, when a height of the stopper 11P is appropriately set, the locking end member 7 of the locking hem 8 pinched by the chuck 11 is brought into contact with the stopper 11P, thereby preventing the clip 10 from moving along the locking hem 8.

Second Exemplary Embodiment

Figure 8:
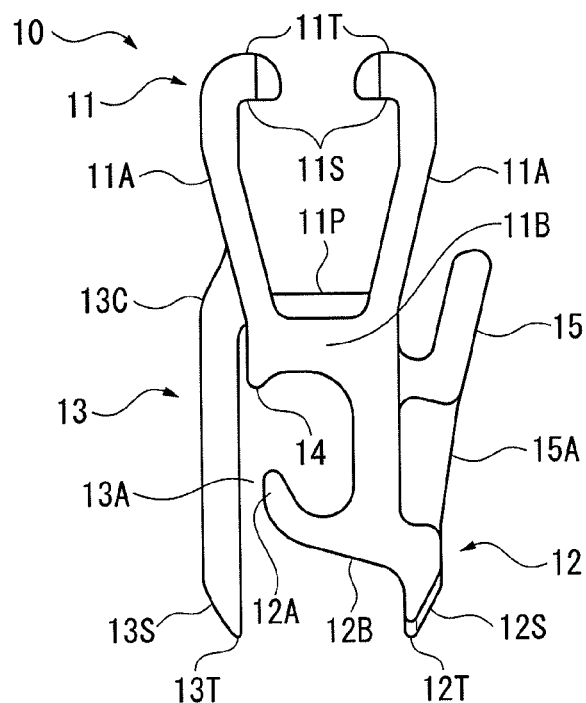
FIG. 8 illustrates a second exemplary embodiment of the invention.

FIG. 8 shows a second exemplary embodiment of the invention.

The clip 10 according to this exemplary embodiment is different in the shape of the guide lever 13. Since the other components are the same as those in the first exemplary embodiment, the overlapping description will be omitted.

In the first exemplary embodiment, the guide lever 13 is raised from the middle of the locking claw 11A of the chuck 11, re-approaches the chuck 11 through the curved portion 13B, and linearly extends from a portion opposed to the guiding projection 14 to the tip end 13T.

In contrast to this, the guide lever 13 according to the exemplary embodiment diagonally projects from the proximal end of the locking claw 11A of the chuck 11 (i.e., near the chuck base 11B) and linearly extends from the projecting portion to the tip end 13T while the curved portion 13B is omitted.

This exemplary embodiment also provides the same advantages as those of the first exemplary embodiment. However, since the curved portion 13B is not provided, deformability of the guide lever 13 owing to the curved portion 13B cannot be improved.

Third Exemplary Embodiment

Figure 9:
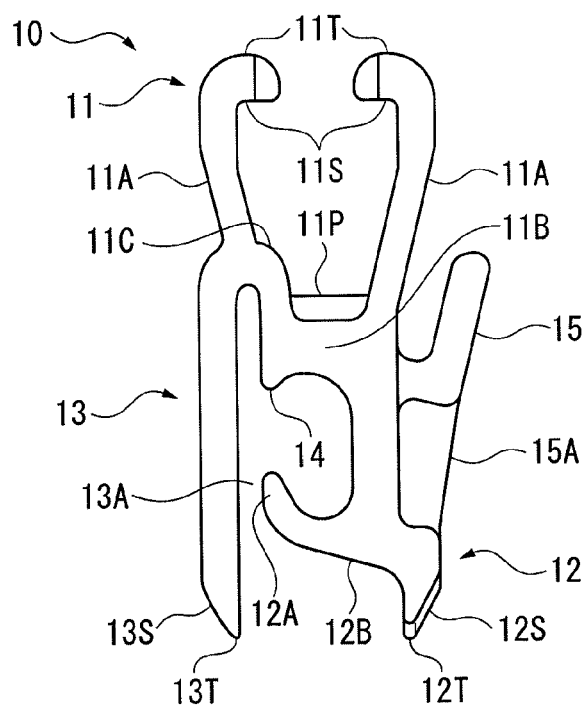
FIG. 9 illustrates a third exemplary embodiment of the invention.

FIG. 9 shows a third exemplary embodiment of the invention.

The clip 10 according to this exemplary embodiment is different in the shapes of the guide lever 13, the locking claw 11A near the guide lever 13 and the chuck base 11B. Since the other components are the same as those in the first exemplary embodiment, the overlapping description will be omitted.

In the exemplary embodiment, a proximal end of one of the locking claws 11A of the chuck 11 is formed with a curved portion 11C. The chuck base 11B is shortened on a side near the guide lever 13 by a dimension of the curved portion 11C. In the guide lever 13, the curved portion 13B is omitted in the same manner as in the second exemplary embodiment. A portion of the guide lever 13 connected to the locking claw 11A is continuous to the curved portion 11C to form a curvature.

This exemplary embodiment also provides the same advantages as those of the first exemplary embodiment. Since the curved portion 13B is also not provided in the exemplary embodiment, although it is difficult to improve deformability of the guide lever 13 owing to the curved portion 13B, deformability of the guide lever 13 can be obtained by the curved portion 11C.

Fourth Exemplary Embodiment

Figure 10:
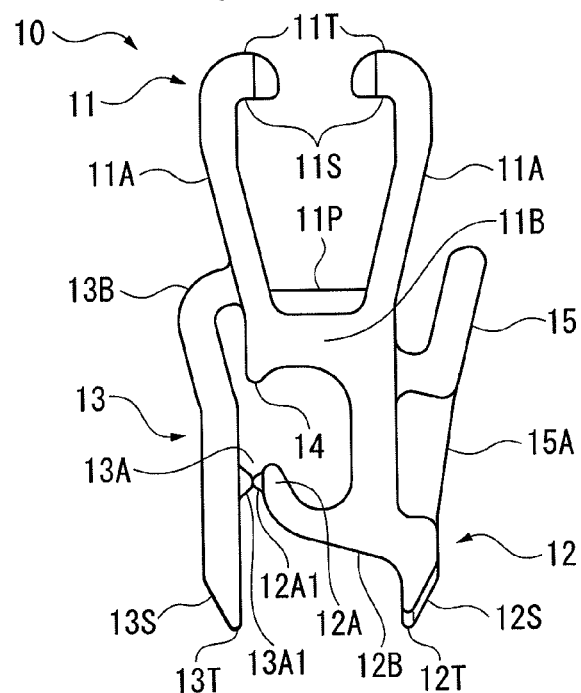
FIG. 10 illustrates a fourth exemplary embodiment of the invention.

FIG. 10 shows a fourth exemplary embodiment of the invention.

The clip 10 according to this exemplary embodiment is different in that projections 13A1 and 12A1 whose tip ends are in contact with each other are respectively formed on the guide lever 13 and the hook 12 that are mutually opposed with the gap 13A therebetween. Since the other components are the same as those in the first exemplary embodiment, the overlapping description will be omitted.

This exemplary embodiment also provides the same advantages as those of the first exemplary embodiment. Further, since the projection 13A1 and 12A1 block the gap 13A, the wire 4 can be prevented from unexpectedly dropping off. Moreover, since the projection 13A1 of the guide lever 13 is in constant contact with the projection 12A1 of the hook 12, the position of the guide lever 13 can be stabilized.

Fifth Exemplary Embodiment

Figure 11:
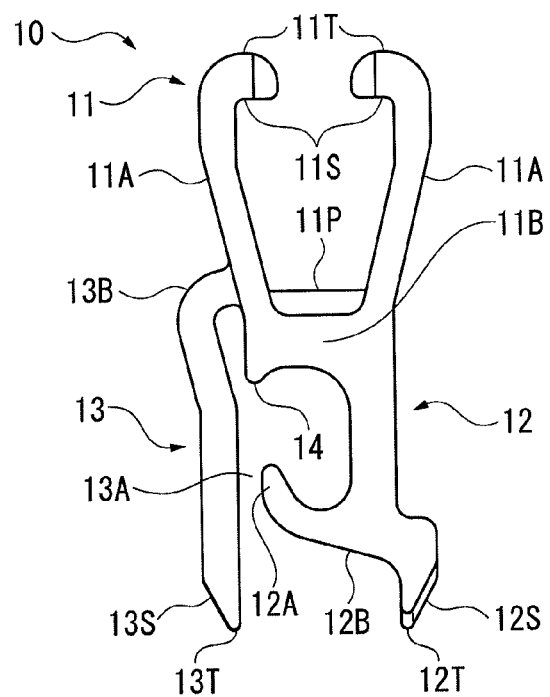
FIG. 11 illustrates a fifth exemplary embodiment of the invention.

FIG. 11 shows a fifth exemplary embodiment of the invention.

The clip 10 according to this exemplary embodiment is different in that the jig receiving portion 15 is omitted. Since the other components are the same as those in the first exemplary embodiment, the overlapping description will be omitted.

In the exemplary embodiment, since the jig receiving portion 15 is not provided, the clip 10 cannot be guided for introduction using an operational jig. However, in the exemplary embodiment, by strongly pressing the clip 10 onto the wire 4, the wire 4 is guided from the outer circumferential surface 12B to the claw portion 12A to expand the gap against the guide lever 13. By such a forcible operation, the wire 4 can pass through the gap 13A. Thus, the same advantages as those in the first exemplary embodiment are obtainable.

Sixth Exemplary Embodiment

Figure 12:
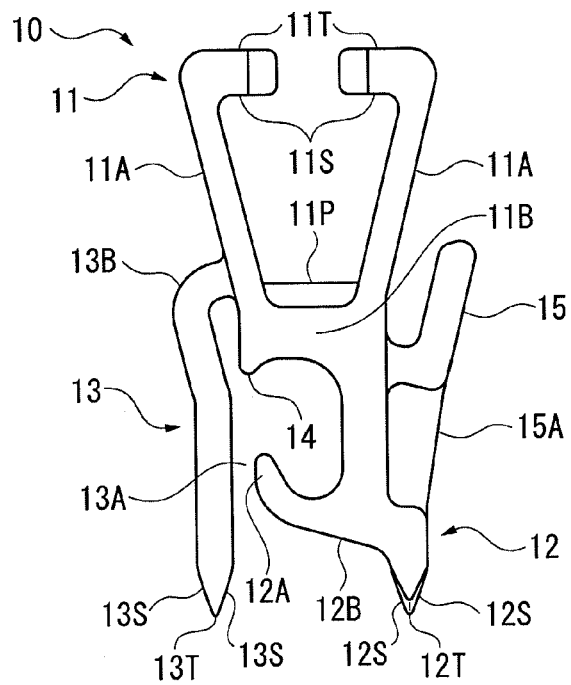
FIG. 12 illustrates a sixth exemplary embodiment of the invention.

FIG. 12 shows a sixth exemplary embodiment of the invention.

The clip 10 according to this exemplary embodiment is different in that the tip ends 11T of the chuck 11 linearly extending in directions facing each other and that the tip ends 12T and 13T of the hook 12 and the guide lever 13 are formed in a triangular mountain (i.e., a saddle roof). Specifically, a pair of inclined surfaces 12S are formed on the tip end 12T while a pair of inclined surfaces 13S are formed on the tip end 13T. Since the other components are the same as those in the first exemplary embodiment, the overlapping description will be omitted.

This exemplary embodiment also provides the same advantages as those of the first exemplary embodiment. Although the tip end 11T is different, since the locking surface 11S on an inner side of the tip end 11T is the same as that in the first exemplary embodiment, the locking hem 8 can be locked in the same manner.

Seventh Exemplary Embodiment

Figure 13:
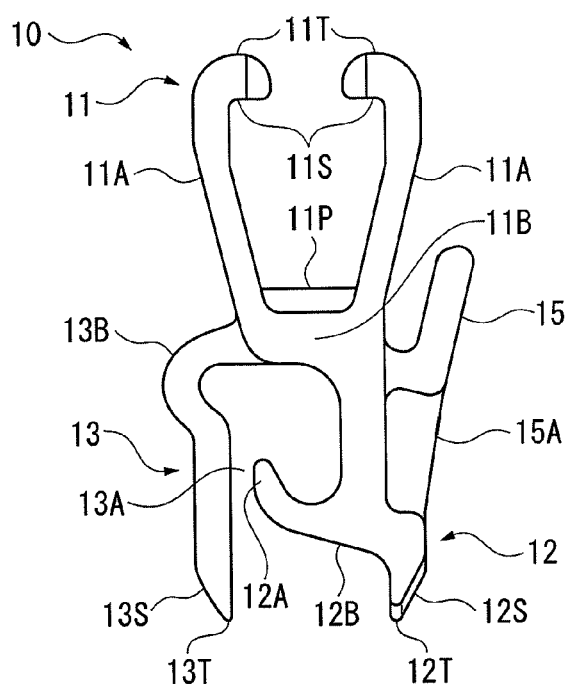
FIG. 13 illustrates a seventh exemplary embodiment of the invention.

FIG. 13 shows a seventh exemplary embodiment of the invention.

The clip 10 according to this exemplary embodiment is different in that the guide lever 13 is connected to the side surface of the chuck base 11B (i.e., the bottom of the chuck 11). Since the other components are the same as those in the first exemplary embodiment, the overlapping description will be omitted.

In the exemplary embodiment, the length of the guide lever 13 up to the tip end 13T becomes short, so that it may be difficult to secure the length enough for serving as the guide lever 13. However, by providing a large curved portion 13B, the substantial length of the guide lever 13 is secured, so that deformability of the guide lever 13 is secured. Accordingly, this exemplary embodiment also provides the same advantages as those of the first exemplary embodiment.

Eighth Exemplary Embodiment

Figure 14:
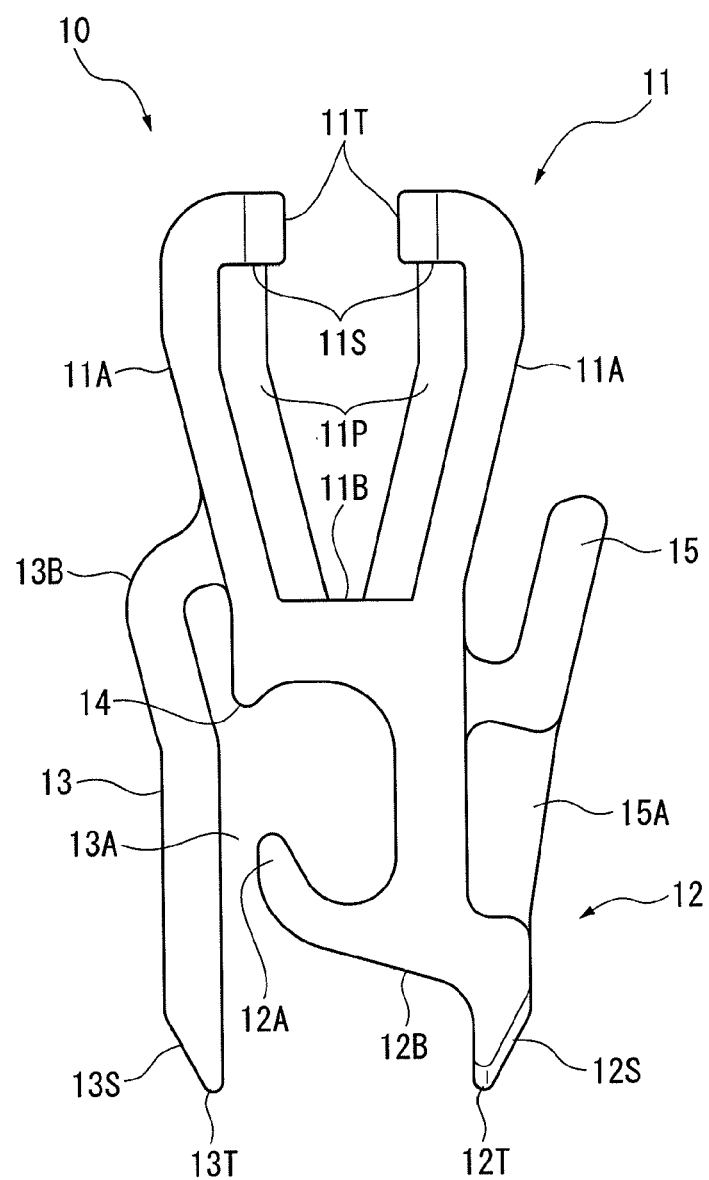
FIG. 14 illustrates an eighth exemplary embodiment of the invention.

FIG. 14 shows an eighth exemplary embodiment of the invention.

The clip 10 according to this exemplary embodiment is different from the first exemplary embodiment in the shape of the stopper 11P formed on the inner side of the locking claws 11A of the chuck 11. Since the other components are the same as those in the first exemplary embodiment, the overlapping description will be omitted.

In the first exemplary embodiment, the stopper 11P is a projection (i.e., a rib) formed on the surface of the chuck base 11B. Both ends of the stopper 11P are connected to the inner surfaces of the opposing locking claws 11A. The stopper 11 is brought into contact with the tip end of the locking end member 7 inserted in the chuck 11.

In contrast to this, the stopper 11P according to the exemplary embodiment is a projection formed on an inner surface of each of the locking claws 11A. One end of the stopper 11P is connected to the surface of the chuck base 11B while the other end thereof is connected to the locking surface 11S.

In the exemplary embodiment, when the locking end member 7 is inserted in the chuck 11, the periphery of the stopper 11P is brought into pressure contact with the side surface of the locking end member 7 to restrict movement of the locking end member 7. In addition, when a groove or the like is formed on the locking end member 7, the movement of the locking end member 7 can be more reliably restricted by engaging the stopper 11P with the groove.

Further, since the stopper 11P is continuously formed in a longitudinal direction of the locking claw 11A along the inner surface of the locking claw 11A, bending rigidity of the locking claw 11A is adjustable.

Accordingly, except for the advantage of the stopper 11P, this exemplary embodiment provides the same advantages as those of the first exemplary embodiment.

Ninth Exemplary Embodiment

Figure 15:
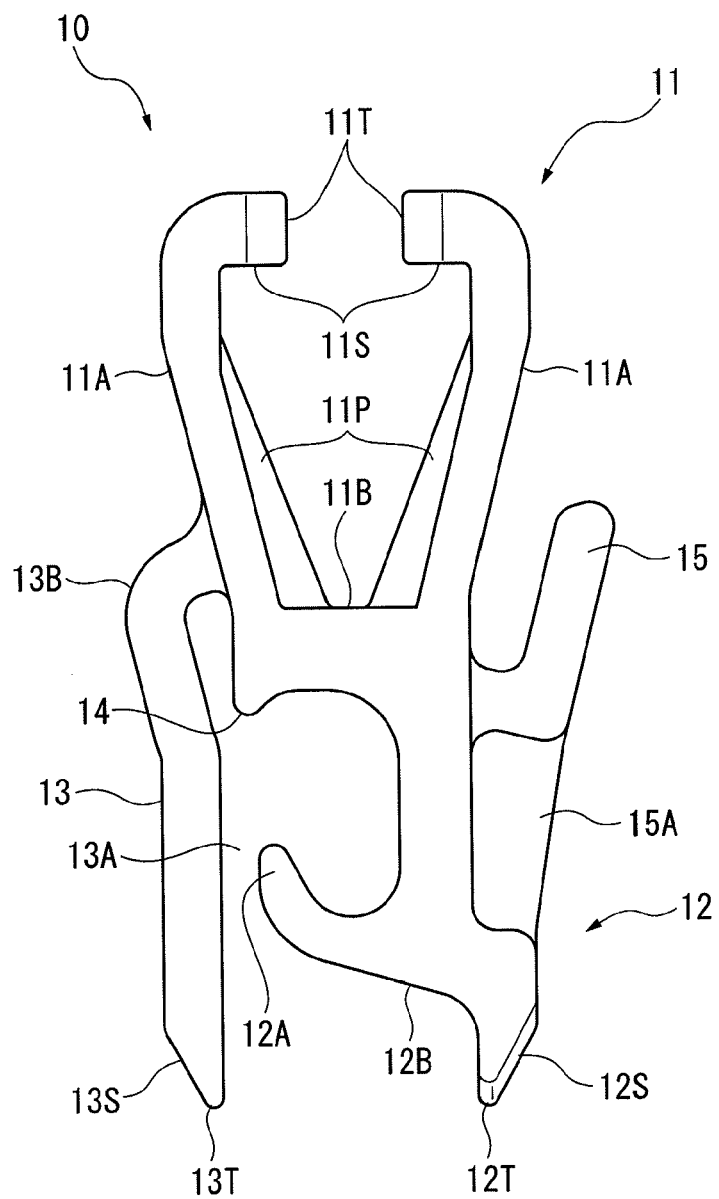
FIG. 15 illustrates a ninth exemplary embodiment of the invention.

FIG. 15 shows a ninth exemplary embodiment of the invention.

The clip 10 according to this exemplary embodiment is different from the first exemplary embodiment in a shape of the stopper 11P formed on the inner side of the locking claws 11A of the chuck 11, in the same manner as in the eighth exemplary embodiment. Since the other components are the same as those in the first exemplary embodiment, the overlapping description will be omitted.

In the eighth exemplary embodiment, the stopper 11P is a projection formed on an inner surface of each of the locking claws 11A. One end of the stopper 11P is connected to the surface of the chuck base 11B while the other end thereof is connected to the locking surface 11S.

In contrast, the stopper 11P according to the exemplary embodiment is a projection formed on an inner surface of each of the locking claws 11A, which is the same as in the eighth exemplary embodiment. One end of the stopper 11P is connected to the surface of the chuck base 11B while the other end thereof is not connected to the locking surface 11S but ends at the inner surface of the locking claw 11A.

This exemplary embodiment also provides the same advantages as those of the eighth exemplary embodiment. However, since the stopper 11P is not connected to the locking surface 11S, the stopper 11P is not effective for adjusting bending rigidity in the area from the locking claw 11A to locking surface 11S.

Tenth Exemplary Embodiment

Figure 16:
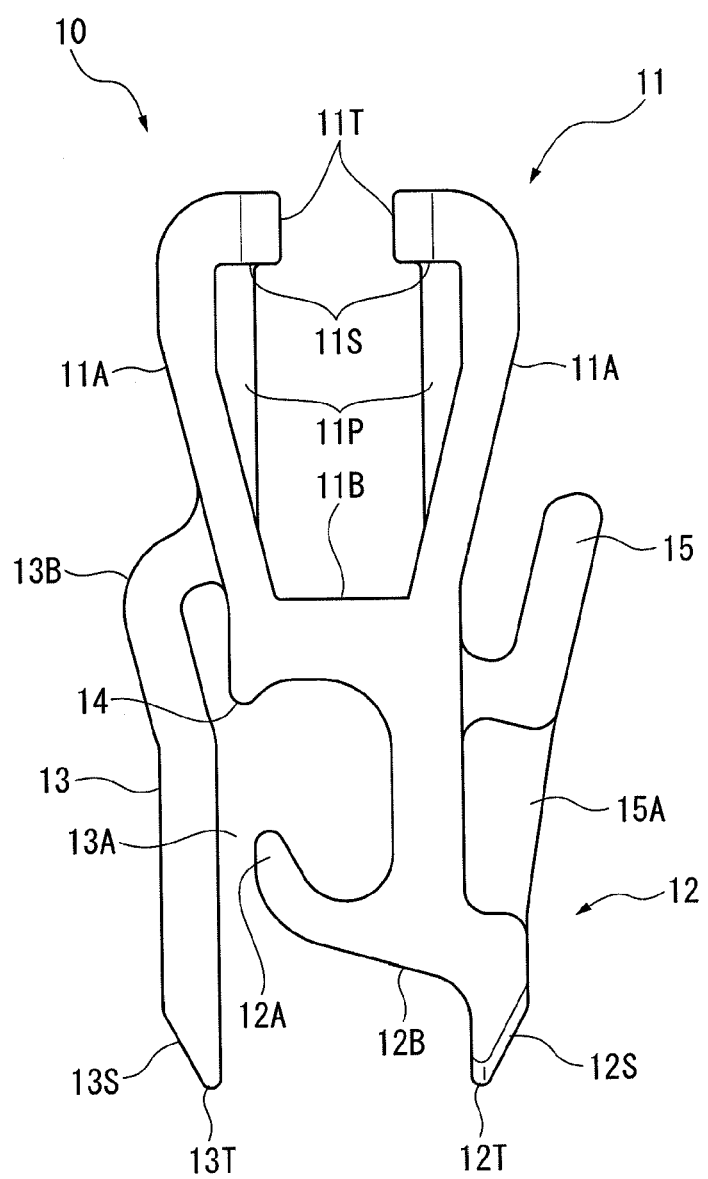
FIG. 16 illustrates a tenth exemplary embodiment of the invention.

FIG. 16 shows a tenth exemplary embodiment of the invention.

The clip 10 according to this exemplary embodiment is different from the first exemplary embodiment in the shape of the stopper 11P formed on the inner side of the locking claws 11A of the chuck 11, in the same manner as in the eighth exemplary embodiment. Since the other components are the same as those in the first exemplary embodiment, the overlapping description will be omitted.

In the eighth exemplary embodiment, the stopper 11P according to the exemplary embodiment is a projection formed on the inner surface of each of the locking claws 11A. One end of the stopper 11P is connected to the surface of the chuck base 11B while the other end thereof is connected to the locking surface 11S.

In contrast, the stopper 11P according to the exemplary embodiment is a projection formed on the inner surface of each of the locking claws 11A, which is the same as in the eighth exemplary embodiment. One end of the stopper 11P is connected to the locking surface 11S while the other end thereof is not connected to the surface of the chuck base 11B but ends at the inner surface of the locking claw 11A.

This exemplary embodiment also provides the same advantages as those of the eighth exemplary embodiment. However, since the stopper 11P is not connected to the surface of the chuck base 11B, the stopper 11P is not effective for adjusting bending rigidity against the chuck base 11B on the base of the locking claw 11A.

Eleventh Exemplary Embodiment

Figure 17:
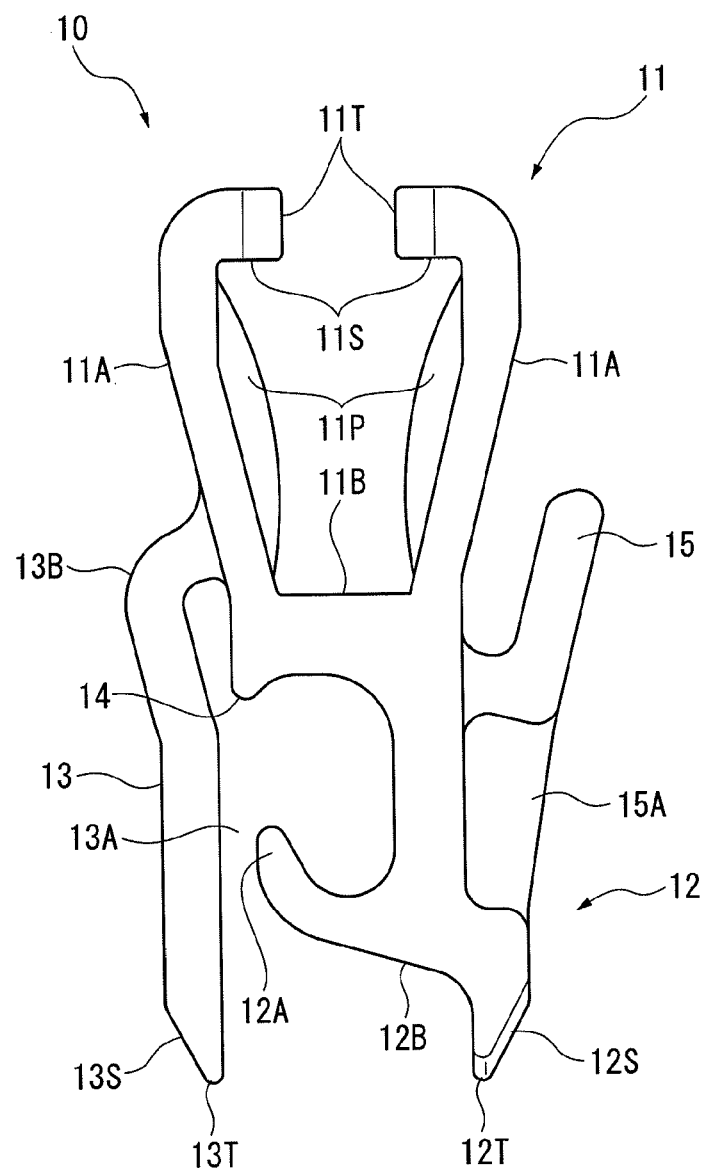
FIG. 17 illustrates an eleventh exemplary embodiment of the invention.

FIG. 17 shows an eleventh exemplary embodiment of the invention.

The clip 10 according to this exemplary embodiment is different from the first exemplary embodiment in the shape of the stopper 11P formed on the inner side of the locking claws 11A of the chuck 11, in the same manner as in the eighth exemplary embodiment. Since the other components are the same as those in the first exemplary embodiment, the overlapping description will be omitted.

In the eighth exemplary embodiment, the stopper 11P according to the exemplary embodiment is a projection formed on the inner surface of each of the locking claws 11A. One end of the stopper 11P is connected to the surface of the chuck base 11B while the other end thereof is connected to the locking surface 11S.

In contrast, although the stopper 11P according to the exemplary embodiment is a projection formed on the inner surface of each of the locking claws 11A, which is the same as in the eighth exemplary embodiment, the ends of the stopper 11P are not connected to either the locking surface 11S or the surface of the chuck base 11B. The stopper 11 is an independent projection on the inner surface of each of the locking claws 11A.

This exemplary embodiment also provides the same advantages as those of the eighth exemplary embodiment. However, since the stopper 11P is not connected to either the locking surface 11S or the surface of the chuck base 11B, the stopper 11P is not effective for adjusting bending rigidity in the area from the locking claw 11A to the locking surface 11S and bending rigidity against the chuck base 11B on the base of the locking claw 11A. However, the stopper 11P is usable for locally adjusting bending rigidity of the middle of the locking claw 11A. In addition, the stopper 11P is suitable for restricting movement of the locking end member 7 while not affecting rigidity of the locking claw 11A.

Modifications

The invention is not limited to the above exemplary embodiments, but detailed shapes and dimensions are changeable as needed in implementation. The material, surface finish, color and the like of the clip 10 are selectable as needed in implementation.

In the above exemplary embodiments, the width of the guide lever 13 in the continuous direction of the locking hem 8 is relatively narrow while the width of the hook 12 in the same direction is relatively wide. However, the width of the guide lever 13 may be the same as the width of the hook 12, or, reversely, the width of the guide lever 13 may be larger than the width of the hook 12. However, it is preferable to make the width of the guide lever 13 narrower in order to ensure deformability of the guide lever 13.

In the above exemplary embodiments, the tip end 12T of the hook 12 is formed in an arc, but may be rectangular. However, forming the tip end 12T in an arc can reduce a possibility that the hook 12 is caught or the like when being introduced into the groove 3.

Similarly, although the tip end 11T of the chuck 11 is chamfered at corners of the portion (i.e., facing edges) through which the locking hem 8 is inserted, the tip end 11T may be rounded or simply be a square corner. However, it is desirable to round or chamfer the tip end 11T for reducing a possibility that the locking hem 8 is caught by the tip end 11T.

In the above exemplary embodiments, the rib 15A for reinforcement attached to the jig receiving portion 15 may be omitted as needed. However, provision of the rib 15A enables reliable transmission of the force from the operational jig to the hook 12, thereby facilitating controlling a posture of the clip 10 by the operational jig.

The jig receiving portion 15 is not limited to a tongue-shaped one suitable to receive the tip end of the slotted screwdriver T, but may be a projection having a round hole suitable for a Phillips screwdriver to be inserted. Thus, the jig receiving portion 15 may be modified as needed to any shape suitable to receive the operational jig.

The invention claimed is:

1. A cover-material fixing clip, comprising:
    a chuck capable of pinching a locking hem formed on a back surface of a cover material;
    a hook capable of locking a wire provided in a groove of a cushion material; and
    a guide lever that is provided facing an opening of the hook, wherein
    a proximal end of the hook is connected to a bottom of the chuck opposite to the cover material,
    the guide lever is connected to a side surface of the chuck, and
    the chuck comprises:
        a pair of locking claws that are fixed to a chuck base; and
        a stopper that is provided on the chuck base and is in a form of a projection extending in directions in which the locking claws face each other.

2. The cover-material fixing clip according to claim 1, wherein
    the guide lever is connected to a middle of the side surface of the chuck, and
    a guiding projection extending toward the guide lever is provided on the bottom of the chuck.

3. The cover-material fixing clip according to claim 1, wherein
    a curved portion is formed in the guide lever.

4. The cover-material fixing clip according to claim 1, wherein
    inclined surfaces are respectively formed on side surfaces of tip ends of the hook and the guide lever, the side surfaces being remote from each other, the inclined surfaces approaching each other toward tip ends thereof.

5. The cover-material fixing clip according to claim 1, wherein
    a jig receiving portion that allows an operational jig to be inserted thereinto from a side of the chuck is provided on a side surface of the hook.

6. A cover-material fixing clip, comprising:
    a chuck capable of pinching a locking hem formed on a back surface of a cover material;
    a hook capable of locking a wire provided in a groove of a cushion material; and
    a guide lever that is provided facing an opening of the hook, wherein
    a proximal end of the hook is connected to a bottom of the chuck opposite to the cover material,
    the guide lever is connected to a side surface of the chuck, and
    the chuck comprises:
        a pair of locking claws that are fixed to a chuck base; and
        a stopper that is provided on an inner surface of each of the locking claws and is in a form of a projection extending in a longitudinal direction of each of the locking claws.

7. The cover-material fixing clip according to claim 6, wherein
    the guide lever is connected to a middle of the side surface of the chuck, and
    a guiding projection extending toward the guide lever is provided on the bottom of the chuck.

8. The cover-material fixing clip according to claim 6, wherein
    a curved portion is formed in the guide lever.

9. The cover-material fixing clip according to claim 6, wherein
    inclined surfaces are respectively formed on side surfaces of tip ends of the hook and the guide lever, the side surfaces being remote from each other, the inclined surfaces approaching each other toward tip ends thereof.

10. The cover-material fixing clip according to claim 6, wherein
    a jig receiving portion that allows an operational jig to be inserted thereinto from a side of the chuck is provided on a side surface of the hook.

* * * * *